Nov. 29, 1949 — C. G. MUENCH — 2,489,922
COMPOSITE WALL PANEL
Filed June 30, 1944
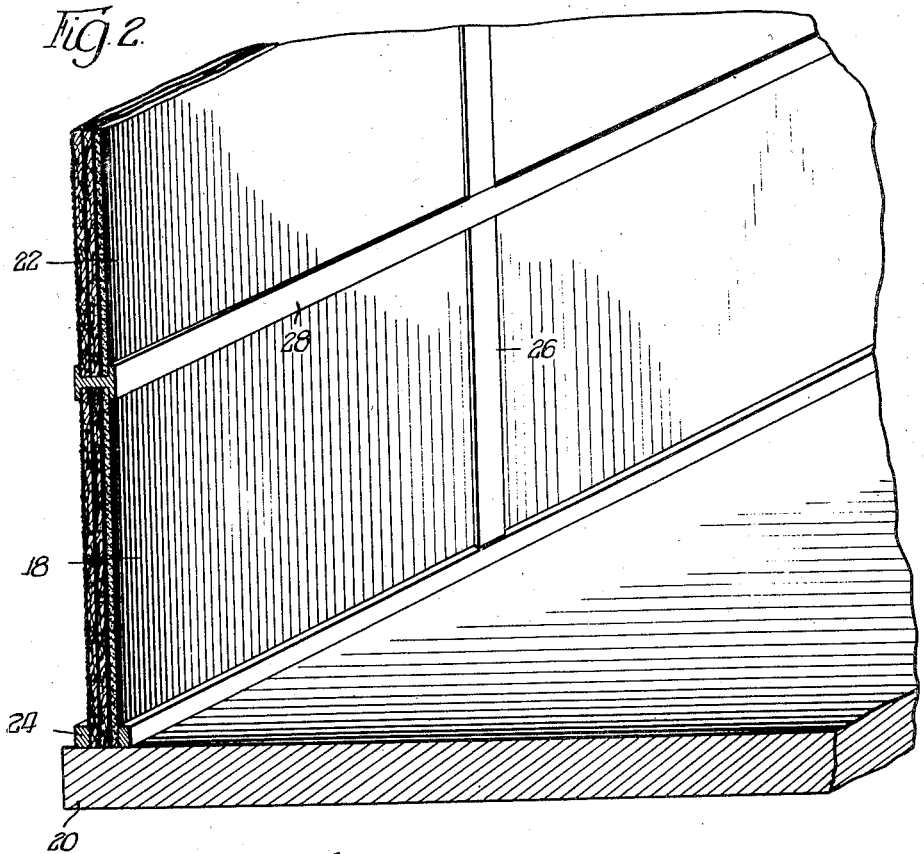
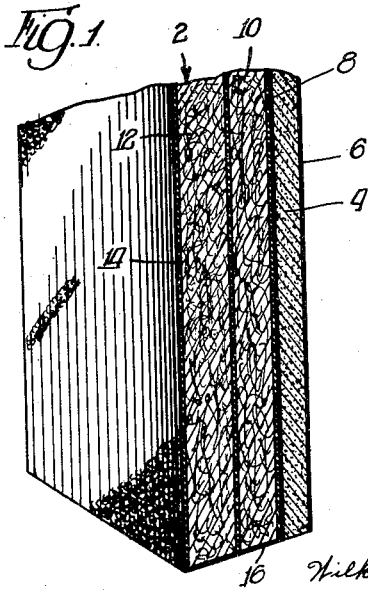
INVENTOR.
Carl G. Muench, Patented Nov. 29, 1949

2,489,922

UNITED STATES PATENT OFFICE 2,489,922

COMPOSITE WALL PANEL

Carl G. Muench, Glenview, Ill., assignor to The Celotex Corporation, Chicago, Ill., a corporation of Delaware Application June 30, 1944, Serial No. 543,017

3 Claims. (Cl. 154—44)

The present invention relates to building materials and more in particular to self-sustaining wall structures formed to provide both exterior and interior wall surfaces.

Among the objects of the present invention is to provide building material in the form of a laminated sheet embodying in the structure thereof means for providing moisture and vapor-proof barriers, thus making the structure admirably suited for exterior walls embodying an interior wall surface.

The present invention more particularly pertains to wall structures which can be readily and easily fabricated to provide pre-formed panels of the shape and size which can be readily assembled to provide the desired exterior and interior surfaces for the assembled structure.

A further object of the present invention is to provide a wall structure having insulating characteristics and formed with a plurality of layers of material, certain of which are adapted to provide finished interior and exterior wall surfaces and others of which are incorporated in the assembly to serve as moisture and vapor-proof barriers to prevent deterioration of the wall structure either by disintegration, curling or warping and to preserve the same under all atmospheric conditions.

A still further object of the present invention is to provide a self-sustaining laminated wall structure having the immediately above identifying characteristics and which has the moisture and vapor-proof barriers of continuous formation extending throughout the body of the wall assembly and embracing or encompassing the edges or ends of the wall structure.

Other objects, features, capabilities and advantages are comprehended by the invention, as will later appear and as are inherently possessed thereby.

Referring to the drawings:

Figure 1 is a fragmentary view in perspective of a composite or laminated wall structure made in accordance with the present invention; and Figure 2 is a fragmentary view in perspective of a structure incorporating the wall panel shown in Figure 1 of the drawings.

Referring now more in detail to the drawings, a wall structure made in accordance with the present invention is shown more particularly in Figure 1 to comprise a body of insulating material 2 and an interior finishing layer of hardened plastic building material 4. While various types of hardened plastic building materials are contemplated in accordance with the present invention, nevertheless the layer of material 4, as shown in the illustration, is constituted as a gypsum board formed in accordance with the usual procedures to include a core of gypsum, to both surfaces of which are secured paper liners, such as 6, which have their outer surface or the outer plies thereof sized to render the same water resistant and with the inner surfaces or plies toward the gypsum core either unsized or lightly sized so that a proper and satisfactory bond is secured between these liners and the gypsum. It is to be noted that in accordance with the present disclosure the gypsum board 4 constituting the inner layer or lamination serves as the interior wall surface of the building structure to which may be applied any desired decorative finish, such as paint, wall paper, or the like.

The laminated wall assembly is further characterized by forming the body of insulating material 2 in a plurality of layers, two being shown in the present illustrative embodiment of the invention and which layers may be constituted by fibrous material such as the well-known "Celotex" fiber board which forms an insulated wall structure particularly adapted for use under the conditions herein portrayed. In order to provide a structure which is moisture and vapor proof, the laminated wall structure further embodies layers of moisture and vapor-proof material, such, for example, as asphalt, which also serves in the capacity of securing the juxtaposed layers together. One of such layers, designated as 8, is disposed between the inner surface covering 4 and the inner layer 10 of fibrous material, while another of such layers of asphalt is disposed between the inner layer of fibrous material 10 and the outer layer of fibrous material 12. The outer layer of fibrous material 12 is also coated with a layer 14 of asphalt material, in the outer surface of which is imbedded a surface covering of granules or other protective particles providing a suitable exterior finish for the building or the like.

In order to assure against the possibility of transmission of moisture or vapor within or through the laminated structure, the ends and edges of the fibrous body of material 2, as at 16, are coated with a layer of asphalt and form a continuation of the layers of asphalt hereinabove described.

It is to be understood that the asphalt layers as shown permeate the fibrous material forming the wall so as to bond therewith and to provide a commercially practical article.

In accordance with the present invention it is contemplated that the composite or laminated wall structure will be formed in panels such as shown at 18 in Figure 2 of the drawings which may be of any suitable length and width and which may be readily and easily assembled in place to form a completed wall structure for a building or the like. As illustrated in Figure 2 of the drawings, which showing is somewhat diagrammatic, the building structure may comprise a floor or foundation 20 providing a support for a wall assembly 22 which includes a plurality of panels 18. As illustrative of the manner in which this wall may be assembled and erected, the foundation or floor 20 may be provided with a channel structure 24 adapted to receive and secure a series of lower panels 18 in operative position with respect thereto. These panels 18 are erected through the medium of channeled studs such as 26 and the horizontally extending channeled frame elements 28 which are interposed between adjacent wall panels for securing the same in position. By means of such a structure, the wall panels may be erected with ease and rapidity to provide the exterior walls for the building and at the same time provide suitable interior wall surfaces which may be decorated, if desired, by the addition of paint, wall paper or the like.

The present wall structure has certain distinguishing characteristics making it particularly adapted for use as hereinabove described, such as the heat insulating properties afforded by the body of fibrous material 2 and the incorporation of moisture and vapor-proof barriers to prevent transmission of moisture and vapor into the various layers forming the same. The moisture and vapor-proof barriers prevent the ingress of moisture and vapor into the layers of fibrous material from the exterior which would otherwise destroy the heat insulating value of the same and which under certain weather conditions would freeze, causing rapid deterioration of the panel structure. On the other hand, while the layer 4 of hardened plastic building material does not prevent transmission of water vapor, nevertheless such water vapor cannot to any appreciable degree penetrate into the layers of fibrous material because of the asphalt barriers incorporated into the present structure. To assure an adequate seal, the panel is entirely enclosed throughout the extent of its ends and edges by a layer of asphalt or the like which in effect constitutes a continuation of the layers of asphalt associated with the layer forming the panel structure.

As a further important feature of the invention, it is to be noted that the interior and exterior surfaces of the wall panel are formed from materials which have a very low coefficient of expansion with variation in atmospheric moisture content and, accordingly, there is no appreciable degree of expansion which would otherwise tend to curl or warp the panel and to cause its deterioration. It is, of course, understood that the materials referred to are the gypsum board interior surface and the asphalt and granular exterior surface formed on the outer face of the fiber board panel 12.

While I have herein described and upon the drawings shown an illustrative embodiment of the invention, it is to be understood that the invention is not limited thereto but may comprehend other constructions, arrangements of parts, details and features without departing from the spirit of the invention.

What is claimed is:

1. A sheet of building material characterized as being of laminated structure providing exterior and interior surfaces, comprising a body of fibre insulation board in the form of a plurality of layers and a juxtaposed body of plaster-board forming the interior surface of said sheet, said body of fibre insulation board being further characterized as including a plurality of layers of moisture and vapor proof material associated therewith, one of which is interposed between each of the layers of fibre insulation board, another of which is interposed between said body of fibre insulation board and said body of plaster-board, and another of which is adapted to provide the exterior surface of said sheet.

2. A self-sustaining wall structure characterized as being formed from a plurality of layers of fibre insulation board and a layer of hardened plastic building material forming the interior surface of said wall, said fibre insulation board being further characterized as including a plurality of layers of bitumen associated therewith to provide moisture and vapor proof barriers, one of which is interposed between each of the layers of fibre insulation board, another of which is interposed between said fibre insulation board and hardened plastic building material, and another of which is adapted to provide the exterior surface of said wall structure.

3. A self-sustaining wall structure characterized as being formed from a plurality of layers of fibre insulation board and a layer of plaster-board adapted to form the interior surface of said structure, said layers being interconnected by layers of asphalt providing moisture and vapor proof barriers, and the outer of said fibre insulation boards having a coating of asphalt provided with a granular surface covering to provide a moisture and vapor proof exterior surface for said wall structure.

CARL G. MUENCH.

REFERENCES CITED

The following references are of record in the file of this patent:

UNITED STATES PATENTS

| Number | Name | Date |
|---|---|---|
| 905,191 | Kelley | Dec. 1, 1908 |
| 1,322,278 | Armstrong | Nov. 18, 1919 |
| 1,336,403 | Weiss | Apr. 6, 1920 |
| 1,362,888 | Mullin | Dec. 21, 1920 |
| 1,474,657 | Walper | Nov. 20, 1923 |
| 1,486,535 | Monroe | Mar. 11, 1924 |
| 1,503,211 | Shaw | July 29, 1924 |
| 1,740,928 | Langguth | Dec. 24, 1929 |
| 1,770,507 | Bemis | July 15, 1930 |
| 1,776,254 | Finley | Sept. 23, 1930 |
| 1,883,486 | Beckwith | Oct. 18, 1932 |
| 1,976,684 | Monroe et al. | Oct. 9, 1934 |
| 2,198,776 | King et al. | Apr. 30, 1940 |